(12) United States Patent
Lu

(10) Patent No.: US 7,017,691 B2
(45) Date of Patent: Mar. 28, 2006

(54) FOLDABLE CART

(76) Inventor: Sheng-Kuai Lu, No. 334, Wuquen Rd., North District, Taichung City 404 (TW)

(*) Notice: Subject to any disclaimer, the term of this patent is extended or adjusted under 35 U.S.C. 154(b) by 165 days.

(21) Appl. No.: 10/798,256

(22) Filed: Mar. 12, 2004

(65) Prior Publication Data

US 2005/0212266 A1  Sep. 29, 2005

(51) Int. Cl.
*B60K 1/02* (2006.01)

(52) U.S. Cl. .................. 180/65.1; 180/908; 180/211; 180/208

(58) Field of Classification Search ............ 180/65.1, 180/908, 211; 280/639, 638, DIG. 5, 652, 280/635, 47.131, 47.1, 646, 208
See application file for complete search history.

(56) References Cited

U.S. PATENT DOCUMENTS 5,028,061 A * 7/1991 Hawkes ............... 280/47.4
5,765,857 A * 6/1998 Hsiao ................. 280/646
6,152,465 A * 11/2000 Shieh ................. 280/62
6,345,836 B1 * 2/2002 Wu ..................... 280/651
6,719,319 B1 * 4/2004 Liao ................... 280/654

* cited by examiner

*Primary Examiner*—Bryan Fischmann
*Assistant Examiner*—Cynthia F. Collado
(74) *Attorney, Agent, or Firm*—Rosenberg, Klein & Lee

(57) ABSTRACT

A foldable cart includes a base with two side wheels driven by a motor and a steering wheel located a front end of the base. An upright frame is pivotably connected to the base by two folding assembly and a handle is pivotably connected to the upright frame by another folding assembly. Each folding assembly includes a first member to which a first part of the cart is connected, a second part of the cart is pivotably connected, and a second member mounted to the second part of the cart. The handle is pivoted relative to the upright frame which is pivoted relative to the base so as to fold the cart into a compact folded assembly.

9 Claims, 7 Drawing Sheets

FOLDABLE CART

FIELD OF THE INVENTION

The present invention relates to a foldable cart that includes at least one folding assembly connected between a base and a handle so as to fold the cart into a compact folding set.

BACKGROUND OF THE INVENTION

A conventional cart generally includes a frame with two wheels on two sides thereof and a handle is connected to the frame. A load is put on a base portion of the frame so that the user may pull the handle and move the load conveniently and easily. Nevertheless, the frame cannot be folded and occupies a lot of space which is not convenient for carry and storage. Some carts are made to be foldable, however, involves only a single function and a complicated folding mechanism.

The present invention intends to provide an electric foldable cart that is easily to be used and folded.

SUMMARY OF THE INVENTION

The present invention relates to a foldable cart which comprises a base having a steering wheel connected to a front end thereof and an upright frame is pivotably connected to two upright tubes of the base by two first folding assemblies. Two wheels are connected on two ends of a shaft connected to the base. Each of the first folding assemblies includes a first member and a second member. The two respective first members are connected to the two upright tubes and the two respective second members are respectively mounted to two tubes of the upright frame. The two tubes of the upright frame are pivotably connected to the first member so that the two tubes of the upright frame are pivotable to the two upright tubes of the base.

A handle is pivotably connected to the upright frame by a second folding assembly which includes a first member and a second member. The first member is connected to a tube of the upright frame and the second member is mounted to a tube of the handle. The tube of the handle is pivotably connected to the first member.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
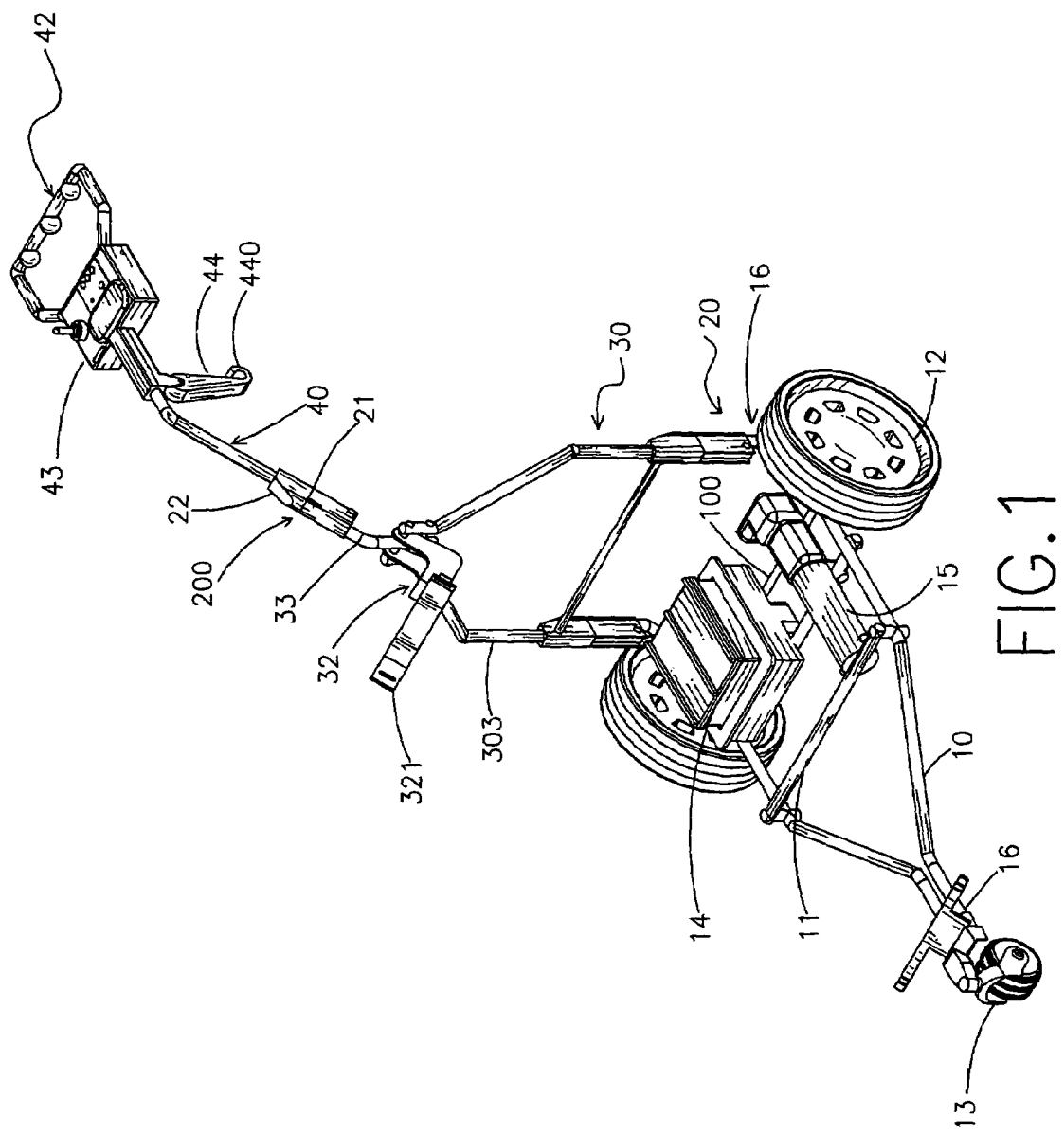
FIG. 1 is a perspective view to show the foldable cart of the present invention.
Figure 2:
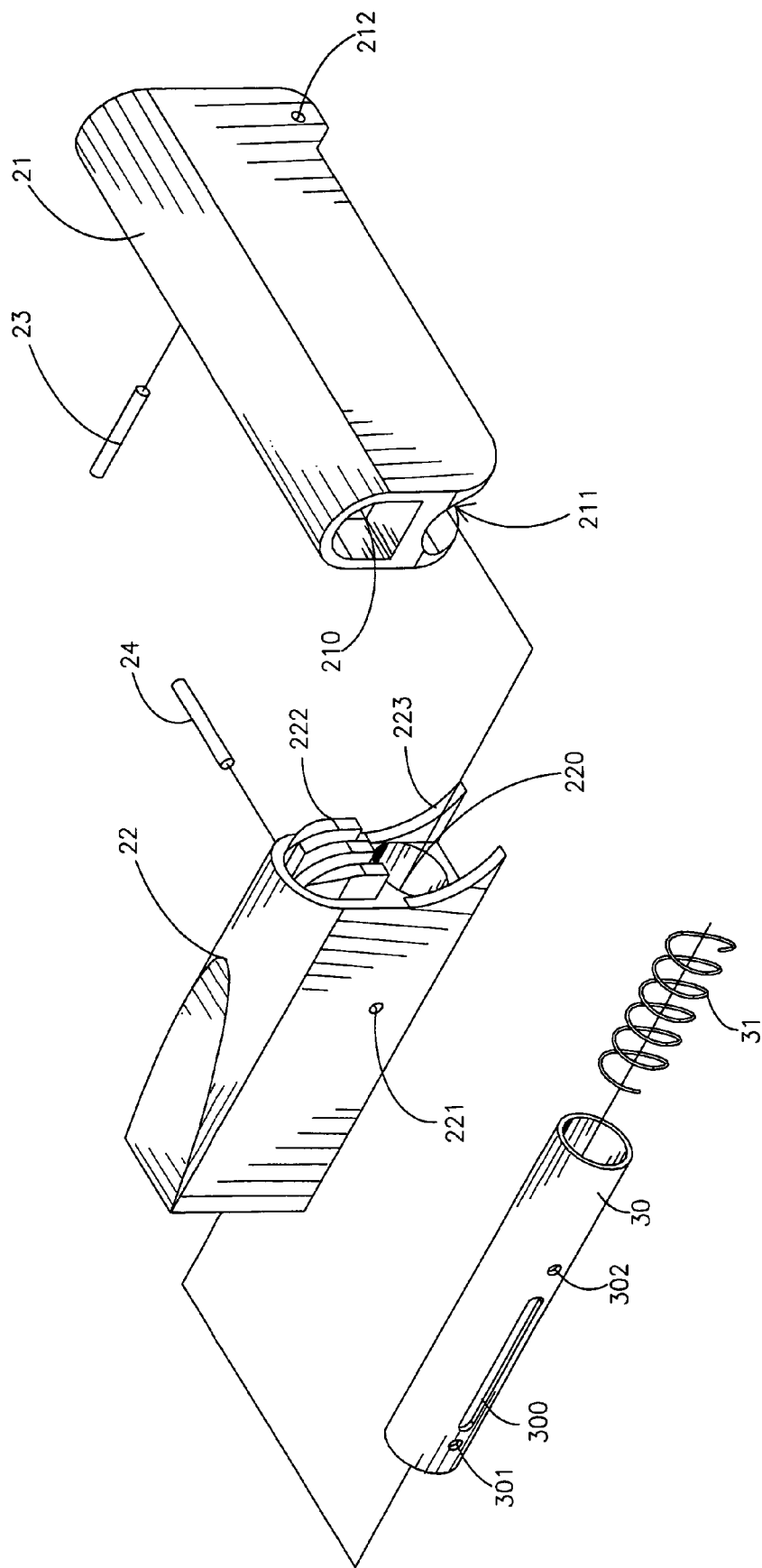
FIG. 2 is an exploded view to show the folding assembly of the present invention.
Figure 3:
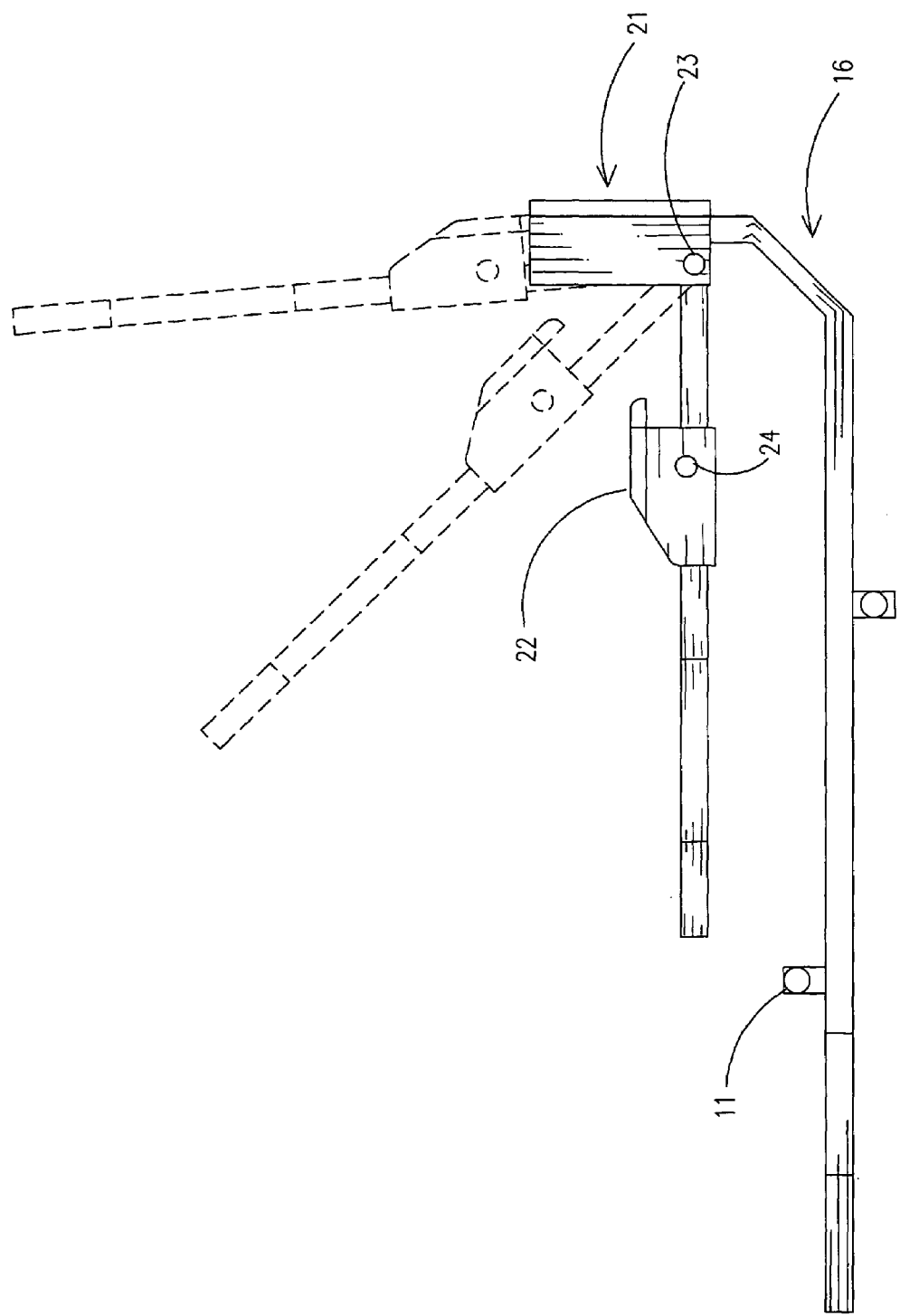
FIG. 3 shows the upright frame is pivoted relative to the base of the foldable cart of the present invention.

Referring to FIGS. 1 to 3, the foldable cart of the present invention comprises a base 10 which includes a Y-shaped frame and a rectangular portion composed of a transverse bar 11 and a shaft 100. A steering wheel 13 is connected to a front end of the Y-shaped frame and two upright tubes 16 extend from a rear end of the base 10. Two wheels 12 are connected on two ends of the shaft 100 and driven by a motor 15 put on the base 10 and the motor 15 is powered by a battery 14.

An upright frame 30 is pivotably connected to the two upright tubes 16 by two first folding assemblies 20. Each of the first folding assemblies 20 includes a first member 21 and a second member 22. The two respective first members 21 having an end connected to the two upright tubes 16, and the two respective second members 22 each have a passage 220 through which the two tubes 303 of the upright frame 30 extend. The two tubes 303 of the upright frame 30 each are engaged with a slot 211 opening to a bottom of the first member 21 and pivotably connected to the first member 21 by extending a pin 23 through two holes 212 in the first member 21 and a hole 302 in the tube of the upright frame 30. Each of the first members 21 of the first folding assemblies 20 includes a recess 210 defined in an end thereof and each of the second members 22 of the first folding assemblies 20 includes guide plates 222 extending from an end thereof. Each of the guide plates 222 have a curve contour and are removably received in the recess 210 in the first member 21 when the first member 21 and the second member 22 are located in alignment with each other. The first member 21 further includes a rounded lower edge located beside the recess 210, and the second member 22 has two plates 223 which include a curve surface which match with the rounded lower edge when the first member 21 and the second member 22 are pivoted from each other. Each of the two tubes 303 of the upright frame 30 includes an elongate slot 300 defined radially therethrough and a protrusion 301 extends inward from an inner periphery of each of the tubes 303 of the upright frame 30. A pin 24 extends through each of the second members 22 and the elongated slot 300 of each of the two tubes 303 of the upright frame 30 in the second member 22. A spring 31 is received in the each of the two tubes 300 of the upright frame 30 and biased between the protrusion 301 and the pin 24 so as to push the second member 22 toward the first member 21.

Figure 4:
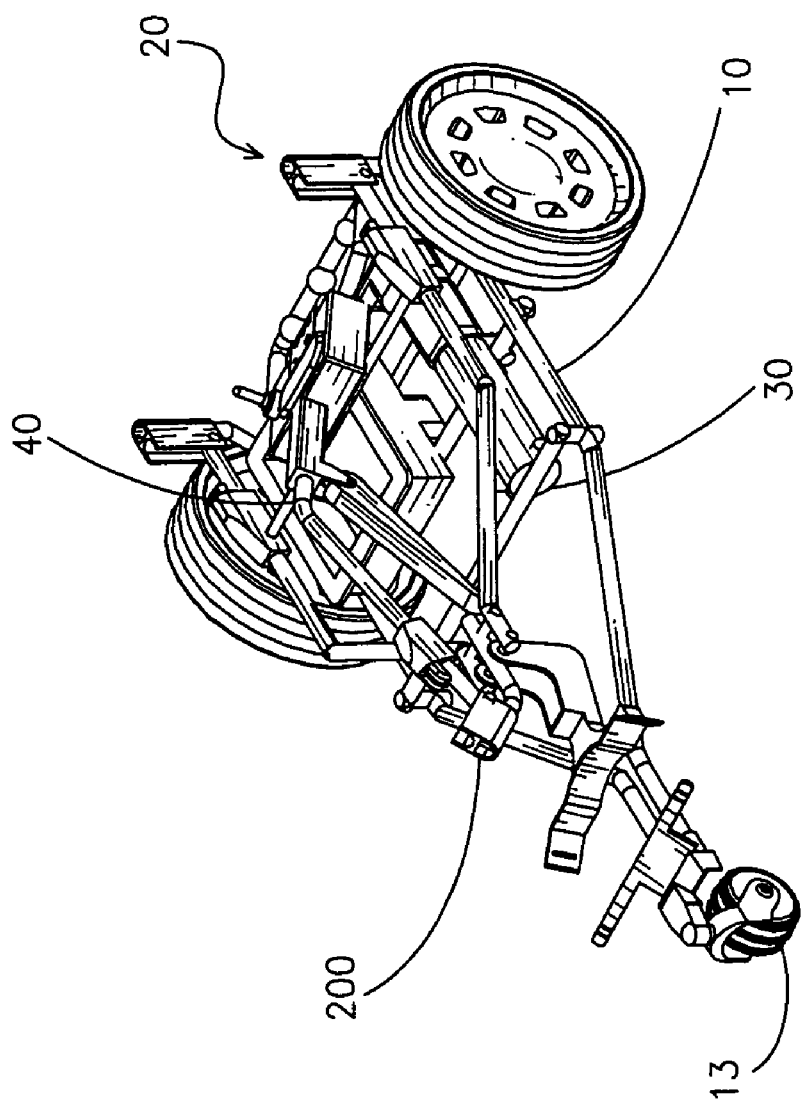
FIG. 4 is the final status of the folded cart of the present invention.
Figure 5:
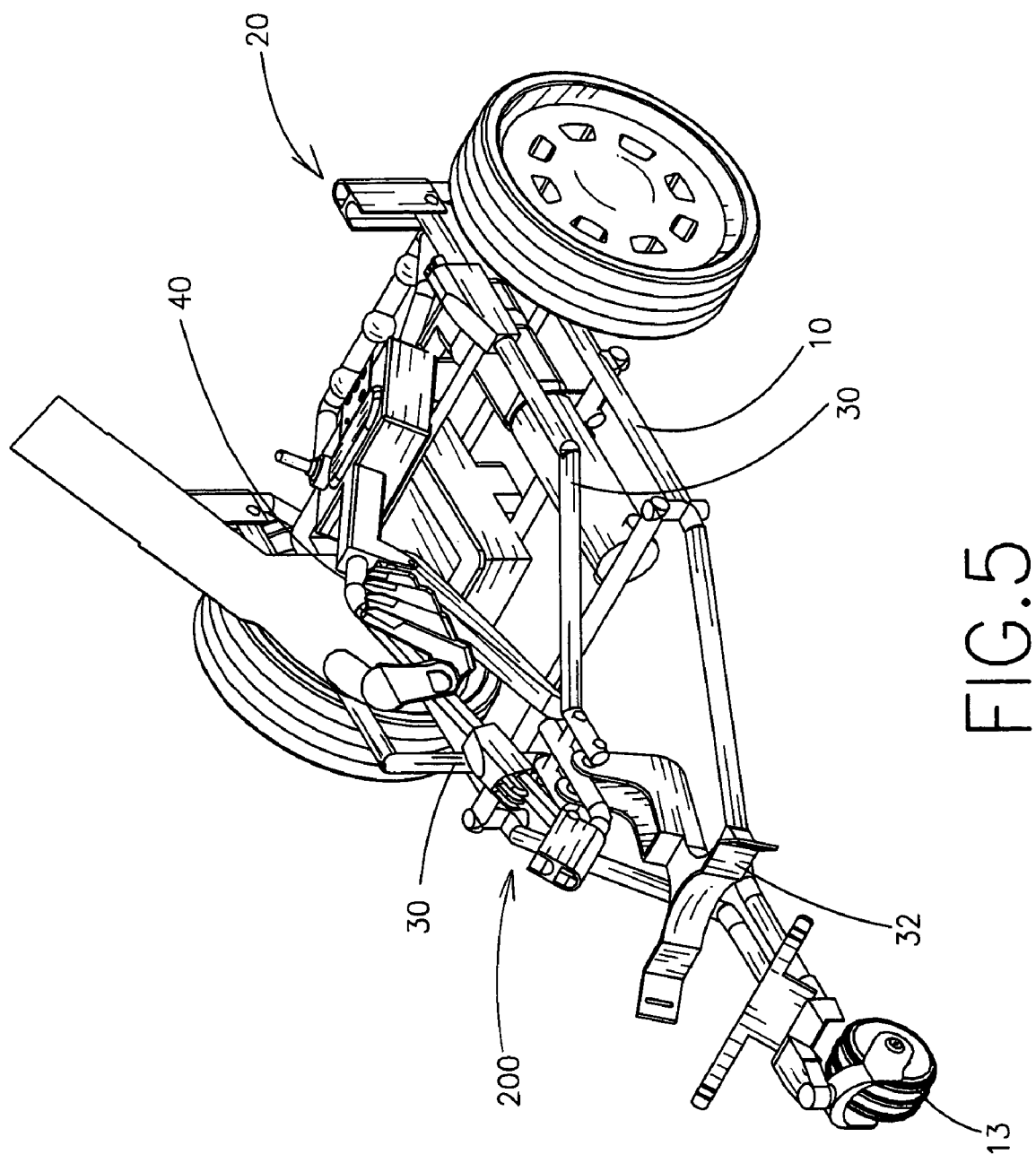
FIG. 5 shows the user to pivot the handle upward.

A handle 40 is pivotably connected to the upright frame 30 by a second folding assembly 200 which includes a first member 21 and a second member 22 as the first folding assembly 20. The first member 21 is connected to a tube 33 of the upright frame 30 and a tube of the handle 40 extends through the second member 22. one of two distal ends of the tube of the handle 40 is further pivotably connected to the first member 21. A grip portion 42 is located at the other distal end of the handle 40 and a control box 43 is connected to the grip portion 42 so as to control the motor 15. A hook 44 is pivotably connected to the handle 40 and includes a hooking end 440 which is hooked to the transverse bar 11 of the base 10 when the upright frame 30 is folded relative to the handle 40 and the base 10 as shown in FIG. 4. The cart can be folded by pivoting the second member 22 about the pin 24 and relative to the first member 21 of the first and second folding assemblies 20, 200. The upright frame 30 and the handle 40 are pivoted toward the base 10. The hook 44 hooks on the transverse bar 11 by its hooking end 440 to secure the handle 40. As shown in FIG. 5, the user may remove the hook 44 and pull the handle 40 upright to expand the cart.

Figure 6:
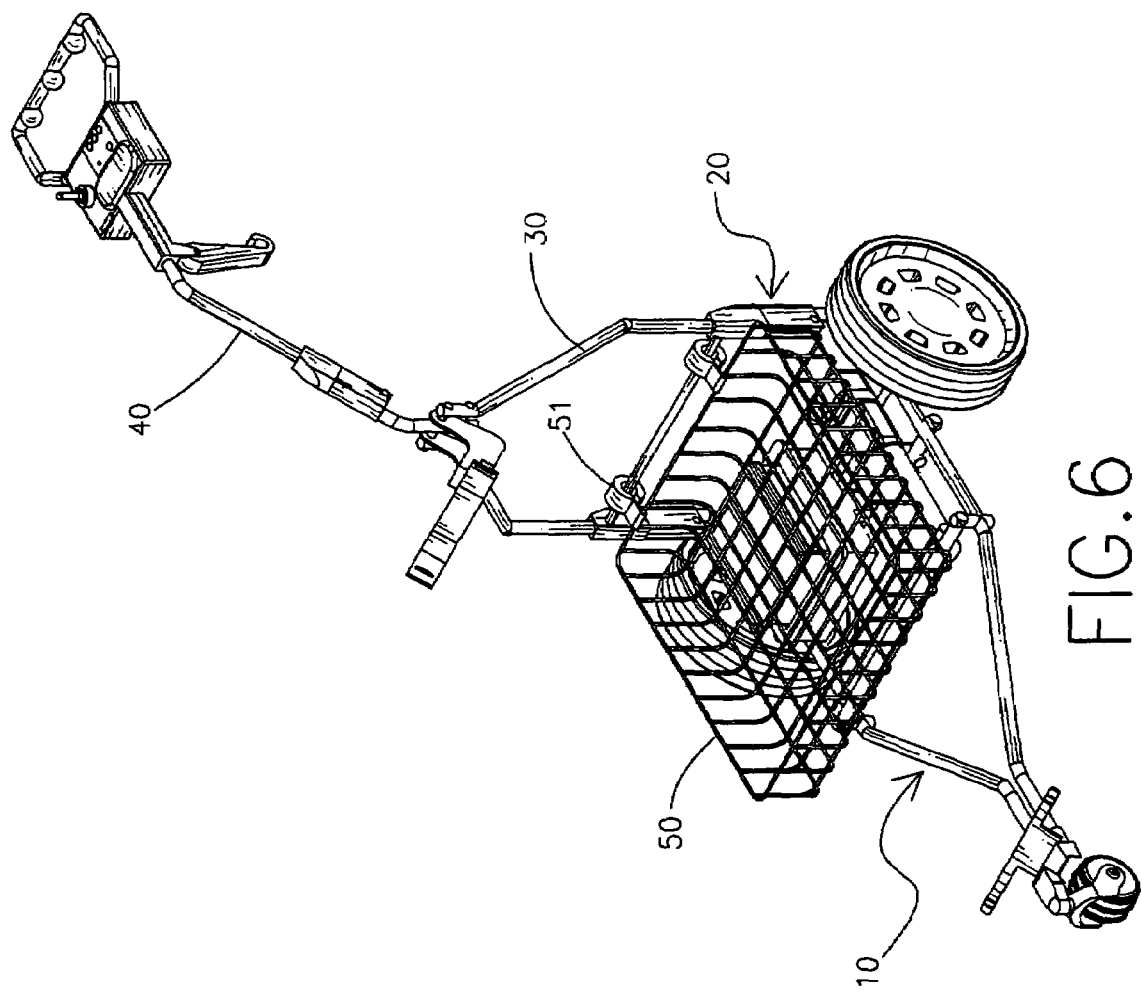
FIG. 6 shows a basket is connected on the base of the cart of the present invention.
Figure 7:
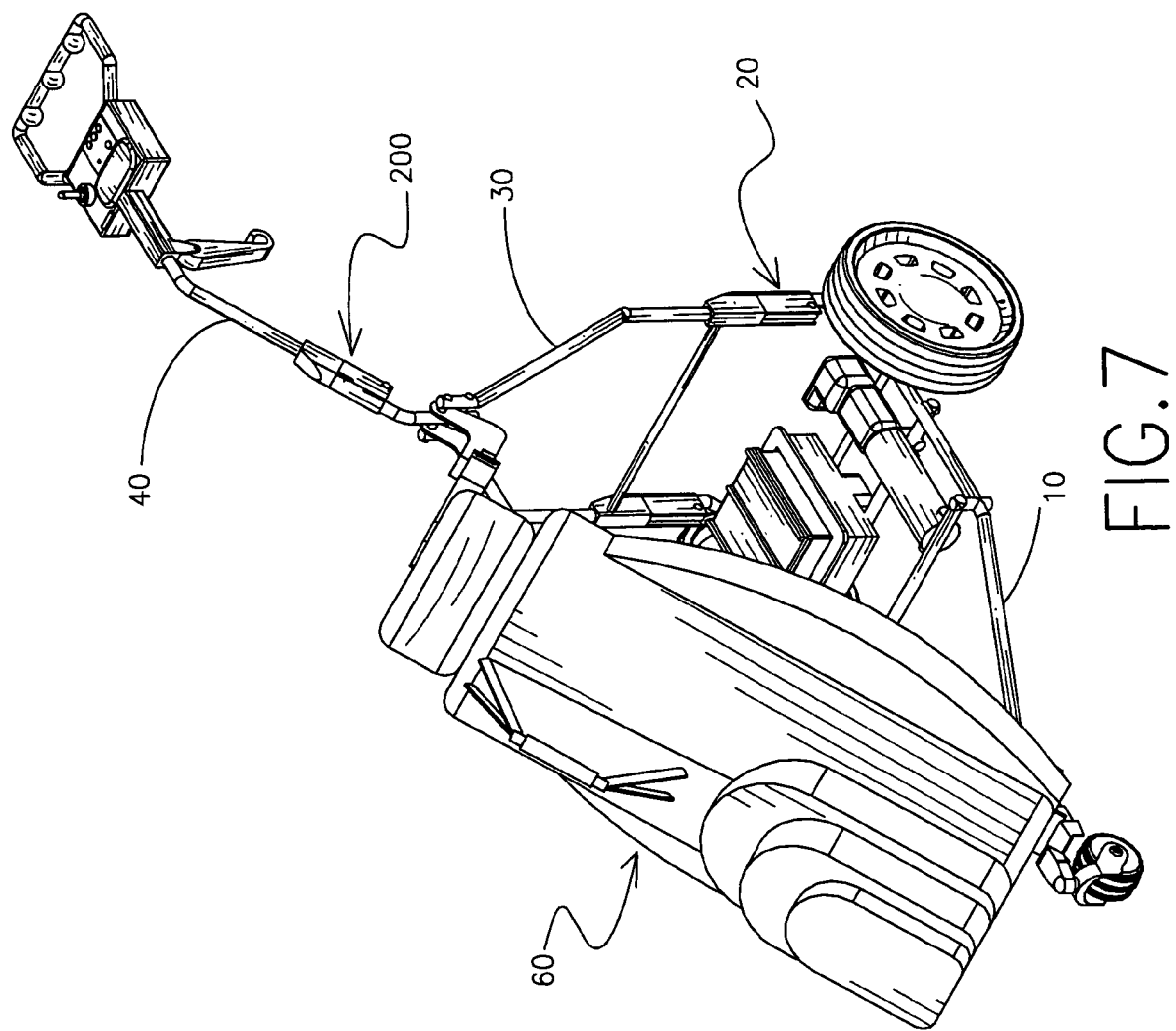
FIG. 7 shows a golf bag is supported on the support members of the cart of the present invention.

A first support member 32 is pivotably connected to the upright frame 30 and includes a Y-shaped portion 321, a second support member 16 is connected to the base 10 and located close to the steering wheel 13 so that a golf bag 60 for example is supported on the two support members 32, 16 as shown in FIG. 7. FIG. 6 shows that a basket 50 is connected on the base 10 of the cart and two rings 51 of the basket 50 are connected to another transverse bar located between the two first folding assemblies 20.

While we have shown and described the embodiment in accordance with the present invention, it should be clear to those skilled in the art that further embodiments may be made without departing from the scope of the present invention.

What is claimed is:

1. A foldable cart comprising:
a base (10) having a steering wheel (13) connected to a front end thereof and two upright tubes (16) extending from a rear end of the base (10), two wheels (12) connected on two ends of a shaft (100) connected to the base (10);
an upright frame (30) pivotably connected to the two upright tubes (16) by two first folding assemblies (20), each of the first folding assemblies (20) including a first member (21) and a second member (22), the two respective first members (21) connected to the two upright tubes (16) and the two respective second members (22) respectively mounted to two tubes of the upright frame (30), the two tubes of the upright frame (30) pivotably connected to the first member (21), and
a handle (40) pivotably connected to the upright frame (30) by a second folding assembly (200), the second folding assembly (200) including a first member (21) and a second member (22), the first member (21) connected to a tube (33) of the upright frame (30) and the second member (22) mounted to a tube of the handle (40), the tube of the handle (40) pivotably connected to the first member (21).

2. The cart as claimed in claim 1, wherein each of the first members (21) of the first and second folding assemblies (20, 200) includes a slot (211) opening to a bottom thereof and the two upright tubes (16) and the tube (33) of the upright frame (30) are engaged therewith.

3. The cart as claimed in claim 1, wherein each of the second members (22) of the first and second folding assemblies (20, 200) includes a passage (220) through which the tube of the handle (40) and the two tubes of the upright frame (30) extend.

4. The cart as claimed in claim 1, wherein each of the first members (21) of the first and second folding assemblies (20, 200) includes a recess (210) defined in an end thereof and each of the second members (22) of the first and second folding assemblies (20) includes guide plates (222) extending from an end thereof, each of the guide plates (222) having a curve contour and being removably received in the recess (210) in the first member (21) when the first member (21) and the second member (22) are located in alignment with each other.

5. The cart as claimed in claim 3, wherein each of the tube of the handle (40) and the two tubes of the upright frame (30) includes an elongate slot (300) defined radially therethrough and a protrusion (301) extends inward from an inner periphery of each of the tube of the handle (40) and the two tubes of the upright frame (30), a pin (24) extending through each of the second members (22) and the elongated slot (300) of each of the tube of the handle (40) and the two tubes of the upright frame (30) in the second member (22), a spring (31) received in the each of the tube of the handle (40) and the two tubes of the upright frame (30), the spring (31) biased between the protrusion (301) and the pin (24) to push the second member (22) toward the first member (21).

6. The cart as claimed in claim 1 further comprising a battery (14) and a motor (15) disposed on the base (10) and the wheels (12) being driven by the motor (15) which is powered by the battery (14).

7. The cart as claimed in claim 6 further comprising a grip portion (42) located at a distal end of the handle (40) and a control box (43) connected to the grip portion (42) so as to control the motor (15).

8. The cart as claimed in claim 1 further comprising a hook (44) pivotably connected to the handle (40) and including a hooking end (440) which is hooked to a transverse bar (11) of the base (10) when the upright frame (30) is folded relative to the handle (40) and the base (10).

9. The cart as claimed in claim 1 further comprising a first support member (32) pivotably connected to the upright frame (30) and a battery (14) and a second support member (16) connected to the base (10).

* * * * *